US006985582B1

United States Patent
Sano et al.

(10) Patent No.: US 6,985,582 B1
(45) Date of Patent: Jan. 10, 2006

(54) ENCRYPTION/DECRYPTION UNIT AND STORAGE MEDIUM

(75) Inventors: Fumihiko Sano, Fuchu (JP); Shinichi Kawamura, Kodaira (JP); Hideo Shimizu, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/388,388

(22) Filed: Sep. 1, 1999

(30) Foreign Application Priority Data

Nov. 27, 1998 (JP) .......................................... 10-337108

(51) Int. Cl.
*H04L 9/06* (2006.01)

(52) U.S. Cl. ........................................ 380/42; 713/191

(58) Field of Classification Search ......... 713/191–193; 380/42
See application file for complete search history.

(56) References Cited

U.S. PATENT DOCUMENTS

| 3,962,539 A | | 6/1976 | Ehrsam et al. | |
|---|---|---|---|---|
| 4,157,454 A | * | 6/1979 | Becker | 380/37 |
| 5,231,662 A | * | 7/1993 | van Rumpt et al. | 713/193 |
| 5,454,039 A | * | 9/1995 | Coppersmith et al. | 380/28 |

(Continued)

FOREIGN PATENT DOCUMENTS

| JP | 51-108701 | 9/1976 |
|---|---|---|
| JP | 10 116029 A | 5/1998 |
| JP | 10-116029 | 5/1998 |
| JP | 2000-89666 | 3/2000 |

OTHER PUBLICATIONS

Feldmeier, David C., "A high–Speed Software DES Implementation", Jun. 1989, Computer Communications Research Group, entire document.*

Fumihiko Sano and Kouichi Sakurai, "DES Compatible 128–bits Key Block Cipher DES–SS."

"Proceedings of the 19th Symposium on Information Theory and Its Application," Dec. 3–6, 1996, vol. 2, IEEE Information Theory Society, Tokyo Chapter.

E. Biham and A. Shamir, "Differential Cryptanalysis of DES–Like Cryptosystems," Journal of Cryptology, vol. 4, No. 1, 1991.

Mitsuru Matsui, "Linear Cryptanalysis of DES Cipher (I)," Encryption and Information Security Symposium, 1993.

American National Standard, "X9.52—1998, Triple Data Encryption Algorithm Modes Of Operation," American Bankers Association, pp. 1–89, (1998).

(Continued)

*Primary Examiner*—Kim Vu
*Assistant Examiner*—Ronald Baum
(74) *Attorney, Agent, or Firm*—Finnegan, Henderson, Farabow, Garrett & Dunner, L.L.P

(57) ABSTRACT

An encryption/decryption unit includes a first data encryption/decryption section for performing an encryption or decryption process, a first data substitution section for performing data substitution of an output from the first encryption/decryption section according to a predetermined permutation table, a second data encryption/decryption section for performing an encryption or decryption process for an output from the first data substitution section, a second data substitution section for performing data substitution of an output from the second data encryption/decryption section according to a predetermined permutation table, and a third data encryption/decryption section for performing an encryption or decryption process for an output from the second data substitution section.

4 Claims, 9 Drawing Sheets

U.S. PATENT DOCUMENTS

| | | | | |
|---|---|---|---|---|
| 5,606,616 A | * | 2/1997 | Sprunk et al. | 380/29 |
| 5,623,548 A | * | 4/1997 | Akiyama et al. | 380/28 |
| 5,623,549 A | * | 4/1997 | Ritter | 380/37 |
| 5,768,390 A | * | 6/1998 | Coppersmith et al. | 380/28 |
| 5,778,074 A | * | 7/1998 | Garcken et al. | 380/37 |
| 6,570,989 B1 | * | 5/2003 | Ohmori et al. | 380/42 |

OTHER PUBLICATIONS

E. Biham et al.: "How to strengthen DES using existing hardware"; Advances in Cryptology—ASIACRYPT'94. $4^{th}$ International Conference on the theory and applications of cryptology. Proceedings, Advances in Cryptology—ASIACRYPT'94. $4^{th}$ International Conference on the theory and applications of cryptology, Wollongo, pp. 398–412, XP000527605 1995, Berlin, Germany, Springer–Verlag.

M.H. Dawson et al.: "An expanded set of design criteria for substitution boxes and their use in strengthening DES–like cryptosystems"; IEEE Pacific Rim Conference on Communications, Computers and Signal Processing (Cat. No. 91CH2954-6), Victoria, BC, Canada, May 9–10, 1991, pp. 191–195 vol. 1 XP000280289 1991.

Bruce Schneier, *Applied Cryptography, Second Edition* 1996, John Wiley & Sons, Inc.

English–language translation of Office Action dated Apr. 6, 2004, from the Japanese Patent Office in Japanese Application No. 10–337108.

* cited by examiner

PERMUTATION TABLE

| | | | | | | | | | | | | | | | |
|---|---|---|---|---|---|---|---|---|---|---|---|---|---|---|---|
| 0 | 1 | 142 | 244 | 71 | 167 | 122 | 186 | 173 | 157 | 221 | 152 | 61 | 170 | 93 | 150 |
| 216 | 114 | 192 | 88 | 224 | 62 | 76 | 102 | 144 | 222 | 85 | 128 | 160 | 131 | 75 | 42 |
| 108 | 237 | 57 | 81 | 96 | 86 | 44 | 138 | 112 | 208 | 31 | 74 | 38 | 139 | 51 | 110 |
| 72 | 137 | 111 | 46 | 164 | 195 | 64 | 94 | 80 | 34 | 207 | 169 | 171 | 12 | 21 | 225 |
| 54 | 95 | 248 | 213 | 146 | 78 | 166 | 4 | 48 | 136 | 43 | 30 | 22 | 103 | 69 | 147 |
| 56 | 35 | 104 | 140 | 129 | 26 | 37 | 97 | 19 | 193 | 203 | 99 | 151 | 14 | 55 | 65 |
| 36 | 87 | 202 | 91 | 185 | 196 | 23 | 77 | 82 | 141 | 239 | 179 | 32 | 236 | 47 | 50 |
| 40 | 209 | 17 | 217 | 233 | 251 | 218 | 121 | 219 | 119 | 6 | 187 | 132 | 205 | 254 | 252 |
| 27 | 84 | 161 | 29 | 124 | 204 | 228 | 176 | 73 | 49 | 39 | 45 | 83 | 105 | 2 | 245 |
| 24 | 223 | 68 | 79 | 155 | 188 | 15 | 92 | 11 | 220 | 189 | 148 | 172 | 9 | 199 | 162 |
| 28 | 130 | 159 | 198 | 52 | 194 | 70 | 5 | 206 | 59 | 13 | 60 | 156 | 8 | 190 | 183 |
| 135 | 229 | 238 | 107 | 235 | 242 | 191 | 175 | 197 | 100 | 7 | 123 | 149 | 154 | 174 | 182 |
| 18 | 89 | 165 | 53 | 101 | 184 | 163 | 158 | 210 | 247 | 98 | 90 | 133 | 125 | 168 | 58 |
| 41 | 113 | 200 | 246 | 249 | 67 | 215 | 214 | 16 | 115 | 118 | 120 | 153 | 10 | 25 | 145 |
| 20 | 63 | 230 | 240 | 134 | 177 | 226 | 241 | 250 | 116 | 243 | 180 | 109 | 33 | 178 | 106 |
| 227 | 231 | 181 | 234 | 3 | 143 | 211 | 201 | 66 | 212 | 232 | 117 | 127 | 255 | 126 | 253 |

| | COMPATIBLE MODE | | | ENHANCED CIPHER MODE | | |
|---|---|---|---|---|---|---|
| | | | | | | |
| FIRST ENCRYPTION/ DECRYPTION SECTION | DES | DES | DES | DES-SS | DES | ... |
| FIRST TRANSPOSITION SECTION | UNUSED | UNUSED | UNUSED | USED | USED | |
| SECOND ENCRYPTION/ DECRYPTION SECTION | DES | DES | DES | DES | DES | ... |
| SECOND TRANSPOSITION SECTION | UNUSED | UNUSED | UNUSED | USED | USED | |
| THIRD ENCRYPTION/ DECRYPTION SECTION | DES | DES | DES | DES-SS | DES | |
| CIPHER TO BE OBTAINED | DES *1 | TRIPLE-DES *2 | DES-SS *3 | PATTERN 1 | PATTERN 2 | |

\*1: SAME KEY IS USED IN FIRST AND SECOND ENCRYPTION/DECRYPTION SECTION

\*2: SAME KEY IS USED IN FIRST AND THIRD ENCRYPTION/DECRYPTION SECTION AND A DIFFERENT KEY IS USED IN SECOND ENCRYPTION/DECRYPTION SECTION

\*3: SAME KEY IS USED IN FIRST AND SECOND ENCRYPTION/DECRYPTION SECTION

FIG. 3

| 1 | 2 | 3 | 4 | 5 | 6 | 7 | * | 8 | 9 | 10 | 11 | 12 | 13 | 14 | * |
| 15 | 16 | 17 | 18 | 19 | 20 | 21 | * | 22 | 23 | 24 | 25 | 26 | 27 | 28 | * |
| 29 | 30 | 31 | 32 | 33 | 34 | 35 | * | 36 | 37 | 38 | 39 | 40 | 41 | 42 | * |
| 43 | 44 | 45 | 46 | 47 | 48 | 49 | * | 50 | 51 | 52 | 53 | 54 | 55 | 56 | * |

\*: REPRESENTS ARBITRARY BIT(0) PADDING OR A PARITY BIT ACCORDING TO DES SPECIFICATION

ENCRYPTION/DECRYPTION UNIT AND STORAGE MEDIUM

BACKGROUND OF THE INVENTION

This application is based on Japanese Patent Application No. 10-337108, filed November 27, 1998, the contents of which are incorporated herein by reference.

The present invention relates to an encryption/decryption unit and storage medium and, more particularly, to an encryption/decryption unit suited to encryption or decryption of data by a secret key block cryptology, and a storage medium.

With the recent advances in computer/communication technology, various types of data are communicated as digital data and stored. The necessity to encrypt these data to protect security and privacy has been increased. Conventionally, data have been encrypted by mainly using the DES (Jpn. Pat. Appln. KOKAI Publication No. 51-108701).

The DES (to be also referred to as the DES hereinafter), however, was an encryption algorithm designed in the 1970s, and cannot be claimed to be safe with respect to current technical advances. As cryptanalytic attacks on the DES, a cryptanalytic exhaustive key search attack, differential attack (E. Biham and A. Shamir, "Differential Cryptanalysis of DES-Like Cryptosystems," Journal of CRYPTOLOGY, Vol. 4, Number 1, 1991) which is more efficient than the exhaustive key search attack, linear attack (Mitsuru Matsui, "Linear Cryptanalysis of DES Ciphertext (I)", Encryption and Information Security Symposium, 1993, and the like are known.

Under the circumstances, the triple-DES is known as an attempt to enhance security against cryptanalytic attacks without greatly changing the popularized DES.

The triple-DES is a scheme of applying the DES three times to perform encryption. According to the procedure for this scheme, two keys are used for encryption by encrypting data with key 1, decrypting the data with key 2, and encrypting the data with key 1. In the triple-DES, since two keys in the DES are used, although each key has 56 bits, the substantial key length can be regarded as 112 bits.

In the triple-DES, however, since the DES is performed three times, the processing becomes longer than that in the DES.

The DES-SS scheme (Jpn. Pat. Appln. KOKAI Publication No. 10-116029) is known as another attempt to enhance the DES.

In the DES-SS scheme (to be also referred to as the DES-SS hereinafter), the safety of the DES is increased by using G functions in addition to F functions as nonlinear functions used inside the DES. In addition, DES-SS processing differs from DES processing only in the addition of G functions, and hence is more efficient than the triple-DES.

In addition, in the DES-SS, one key itself has 112 bits, unlike in the triple-DES using a plurality of 56-bit keys. The DES-SS is safer from the exhaustive key search attack than the triple-DES.

A 56-bit key in the DES is represented by 64 bits including eight parity bits. In the DES-SS, if the upper 64 bits of a key are equal in value to the lower 64 bits of the key, the DES-SS operates as an encryption function having the same function as that of the DES. This is a characteristic feature unique to the DS-SS. In an encryption/decryption unit having the DES-SS, therefore, the DES compatible mode can be set.

The principle of this DES compatible mode is based on the fact that when the upper and lower bit data of a key are equal, an input and output of the G function coincide with each other, i.e., identity conversion is performed. By using the DES compatible mode of the DES-SS, one encryption/decryption unit can perform two types of encryption. This makes it possible to reduce the unit size.

As described above, the DES, triple-DES, and DES-SS have their own merits and demerits. In consideration of the increasing demand for data encryption, increasing necessity of enhancement, proliferation of the DES, and the like, it is important to provide a technique of implementing enhanced cryptology while maintaining compatibility with the DES and its applied cryptographic techniques.

In implementing this technique, consideration must also be given to the efficiency of cryptography.

If, for example, the DES-SS is used, encryption safer than the DES and more efficient than the triple-DES can be performed. Consider the implementation of encryption compatible with the triple-DES by using the DES-SS. Although encryption compatible with the triple-DES can be implemented by stacking three DES-SS processes, the efficiency of this operation becomes lower than the triple-DES.

Each of the DES, triple-DES, and DES-SS uses a scheme called product encryption, in which a process having the same structure is repeatedly performed by using round functions. This type of encryption is susceptible to the above differential and linear attacks.

BRIEF SUMMARY OF THE INVENTION

It is an object of the present invention to provide an encryption/decryption unit which can implement a single encryption algorithm that is compatible with all the DES, triple-DES, and DES-SS, more efficient than an algorithm implemented by simply stacking three DES-SS processes, and resistant to differential and linear attacks.

According to the first aspect of the present invention, there is provided an encryption/decryption unit for encrypting a plaintext into a ciphertext and/or decrypting a ciphertext into a plaintext, comprising first encryption/decryption means for performing an encryption or decryption process, first substitution means for performing data substitution of an output from the first encryption/decryption means according to a predetermined permutation table, second encryption/decryption means for performing an encryption or decryption process for an output from the first substitution means, second substitution means for performing data substitution of an output from the second encryption/decryption means according to a predetermined permutation table, and third encryption/decryption means for performing an encryption or decryption process for an output from the second substitution means.

According to the present invention, a single encryption algorithm compatible with all the DES, triple-DES, and DES-SS is implemented by adjusting the contents of each encryption/decryption means and the used/unused state of each substitution means. This algorithm is more efficient than that obtained by simply stacking three DES-SS processes. In addition, since the continuity of data can be disturbed by performed data substitution using the substitution means, the algorithm is resistant to differential and linear attacks.

In addition, the compatible mode with respect to the DES, triple-DES, and the like and the enhanced cipher mode can be easily switched by controlling the contents of intermediate keys supplied to the first and second substitution means.

Furthermore, the respective modes in the compatible modes with respect to the DES, triple-DES, and the like can be easily switched by controlling the contents of intermediate keys supplied to the first through third encryption/decryption means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an example of an encryption/decryption unit according to the first embodiment of the present invention;

FIG. 2 is a view showing an example of a permutation table having low differential and linear probabilities and used in a data substitution section and the like;

FIG. 3 is a view showing an example of how the states of the respective functional sections are combined;

DETAILED DESCRIPTION OF THE INVENTION

Embodiments of the present invention will be described below.

First Embodiment

Figures 1, 2:
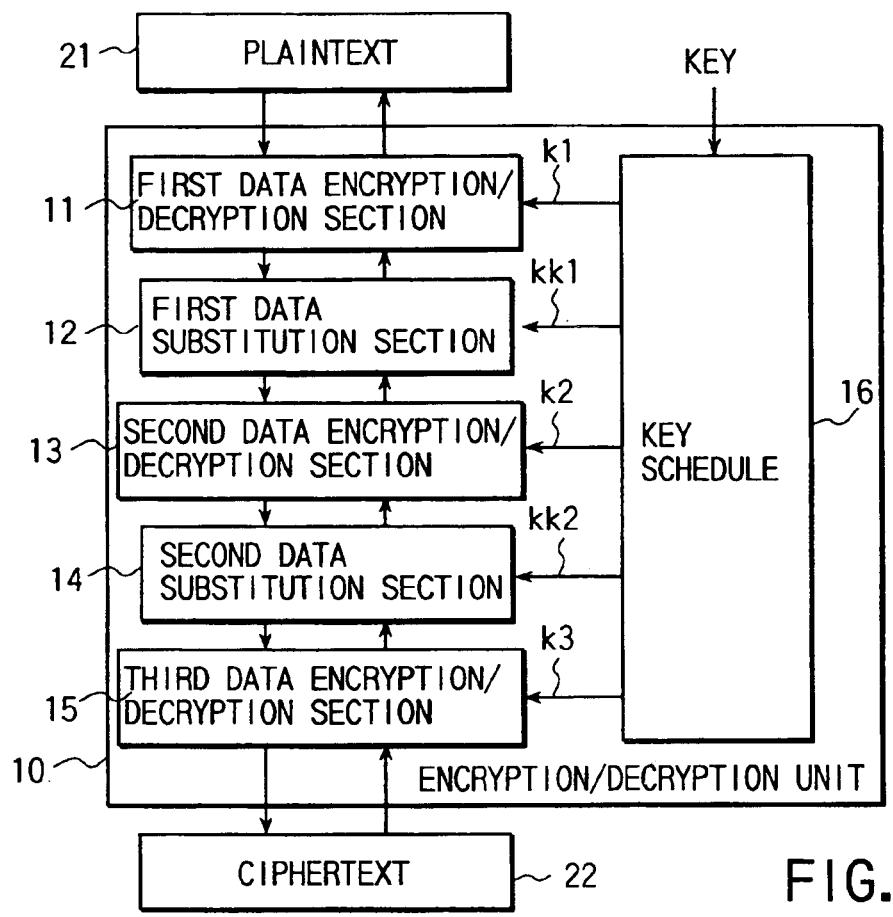

FIG. 1 is a block diagram showing an example of an encryption/decryption unit according to the first embodiment of the present invention.

An encryption/decryption unit 10 includes first, second, and third data encryption/decryption sections 11, 13, and 15, first and second data substitution sections 12 and 14, key schedule 16, and control section (not shown) for controlling the functional sections 1 through 16. This encryption/decryption unit 10 is used as an encryption unit, decryption unit, or encryption/decryption unit.

When a plaintext 21 is to be input to the first data encryption/decryption section 11 to output a ciphertext 22 through the first data substitution section 12, second data encryption/decryption section 13, second data substitution section 14, and third data encryption/decryption section 15, the encryption/decryption unit 10 functions as an encryption unit. When the ciphertext 22 is to be input to the third data encryption/decryption section 15 to undergo reverse processing to that described above, the encryption/decryption unit 10 functions as a decryption unit. Whether the unit 10 functions as either of the above units is determined by the processing performed by the control section.

The encryption/decryption unit 10 is comprised of computer elements such as a CPU, memory, and the like from a hardware viewpoint. The respective functional sections 11 through 16 are implemented by controlling these computer elements according to predetermined programs. That is, the functional sections 11 through 16 constitute a function implementing means which is a combination of hardware resources and software resources. In addition, as the above computer elements and programs, those provided for a computer such as a personal computer or workstation are used, or dedicated chips are formed and ensured for the encryption/decryption unit 10.

The arrangements of the above functional sections 11 through 16 will be described next.

The key schedule 16 expands externally input key data K into intermediate keys and supplies them to a data randomizer made up of the functional sections 11 through 15.

The data randomizer made up of the functional sections 11 through 15 encrypts or decrypts the plaintext 21 or ciphertext 22 as a 64-bit input by randomizing it using keys from the key schedule 16, and outputs the resultant data as the corresponding ciphertext 22 or plaintext 21.

In this case, the first data encryption/decryption section 11 has the same arrangement as that of a DES-SS data randomizer. This section receives the plaintext 21, performs randomizing processing as encryption processing under the control of the intermediate key input from the key schedule 16, and outputs the resultant data to the first data substitution section 12. In contrast to this, the first data encryption/decryption section 11 decrypts an input from the first data substitution section 12 by using an intermediate key from the key schedule 16, and outputs the resultant data as the plaintext 21. Since decryption processing is reverse to encryption processing, as described above, the functional sections 12 through 15 will be described only in the case of encryption, and a description about decryption will be omitted unless otherwise specified.

In addition, since the first data encryption/decryption section 11 has the same arrangement as that of the DES-SS unit, when the contents of an intermediate key from the key schedule 16 remain the same, the section 11 simply functions as a DES unit. The DES-SS will be described in detail in the second embodiment.

The first substitution section 12 performs substitution processing for the data input from the first data encryption/decryption section 11 by using an intermediate key and permutation table, and inputs the resultant output to the second data encryption/decryption section 13. When the intermediate key has a specific value, the first data substitution section 12 can be set in an unused state. In the unused state, the first data substitution section 12 outputs input data without any change. In this case, a permutation table is formed by a method of using random numbers or an algebraic method (using mathematical expressions). In any case, a permutation table with low differential and linear probabilities, i.e., with high resistance to differential and liner attacks, is formed.

FIG. 2 shows an example of a permutation table having low differential and linear probabilities and used in a data substitution section or the like.

Such a table is formed by using algebraic expressions that can realize proper (low) differential and linear probabilities (e.g., calculating $x^{(-1)}$ by using a primitive polynomial ($x^8+x^4+x^3+x^2+1$) over a finite field GF ($2^8$), where "^" indicates exponentiation) or repeating random number calculation until proper differential and linear probabilities are set.

In this embodiment, proper differential and linear probabilities are preferably twice or less ideal values, respectively. In the case of eight bits, the ideal value of the differential probability is 4/256, and the ideal value of the linear probability is 16/256.

The second data encryption/decryption section 13 has the same arrangement as that of a DES data randomizer. This section performs randomizing processing for an output from the first data substitution section 12 under the control of an intermediate key from the key schedule 16, and outputs the resultant data to the second data substitution section 14. Note that the randomizing processing in this case is decryption processing for generating the ciphertext 22. In contrast to this, to decrypt the ciphertext 22 into the plaintext 21, encryption processing is performed.

The second data substitution section 14 has the same arrangement as that of the second data encryption/decryption section 13. This section performs data substitution processing of data by using an intermediate key and permutation table, and outputs the resultant data to the third data encryption/decryption section 15. If the intermediate key remains the same, the second data substitution section 14 is set in an unused state, i.e., an input coincides with an output.

The third data encryption/decryption section 15 has the same arrangement as that of a DES-SS data randomizer. This section performs randomizing processing as encryption processing under the control of the intermediate key input from the key schedule 16, and outputs the ciphertext 22. Since the third data encryption/decryption section 15 also has the same arrangement as that of a DES-SS unit, if the contents of an intermediate key from the key schedule 16 remain the same, the section 15 simply functions as a DES unit.

The operation of the encryption/decryption unit having the above arrangement according to this embodiment will be described next.

In this encryption/decryption unit, in accordance with intermediate keys from the key schedule 16, the first and second data encryption/decryption sections 11 and 15 can be selectively used as "DES" or "DES-SS" units, and the first and second data substitution sections 12 and 14 can be selectively set in the "used" or "unused" state. With this arrangement, the combination of the states of the functional sections 11 through 15 can be changed, as needed.

FIG. 3 shows an example of how the states of the respective functional sections are combined.

Referring to FIG. 3, first of all, when the first and third data encryption/decryption sections 11 and 15 are set in the DES mode and the first and second data substitution sections 12 and 14 are set in the unused state, while the same key is used in the first and second data encryption/decryption sections 11 and 13, the encryption/decryption unit functions as a DES encryption/decryption unit as a whole. In this embodiment, the second data encryption/decryption section 13 is fixed in the DES mode from the beginning.

This is because when the second data encryption/decryption section 13 performs decryption processing in encrypting the plaintext 21, the data encrypted by the first data encryption/decryption section 11 is decrypted into the plaintext 21 by the second data encryption/decryption section 13.

When the first, second, and third data encryption/decryption sections 11, 13, and 15 are set in the DES mode and the first and second data substitution sections 12 and 14 are set in the unused state, the overall encryption/decryption unit functions as a triple-DES unit. The triple-DES is a scheme of encrypting a plaintext with a first key, decrypting the resultant output with a second key, and encrypting the resultant output with the first key. In this case, the first data encryption/decryption section 11 serves to perform the first encryption, the second data encryption/decryption section 13 serves to perform the next decryption, and the third data encryption/decryption section 15 serves to perform the final encryption.

When the first data encryption/decryption section 11 is set in the DES mode and the first and second data substitution sections 12 and 14 are set in the unused state while the same key is used in the first and second data encryption/decryption sections 11 and 13, the overall encryption/decryption unit is set in the DES-SS mode. As in the above case, the processes performed by the first and second data encryption/decryption sections 11 and 13 cancel each other, and the plaintext 21 is input to the third data encryption/decryption section 15.

The DES, triple-DES, and DES-SS modes of the encryption/decryption unit 10 according to this embodiment have been described above.

When the first and second data substitution sections 12 and 14 are to be used, an enhanced cipher mode is set as compared with the above compatible mode. In each case described below, the first and second data substitution sections 12 and 14 are used.

When, for example, all the first, second, and third data encryption/decryption sections 11, 13, and 15 are used in the original modes (DES-SS, DES, and DES-SS) (pattern 1 in FIG. 3), the-triple-DES and DES-SS are combined, and randomizing processes based on a permutation table are added between the respective processes.

In this case, data randomizing is sufficiently performed with a long DES-SS key by repeating a round function belonging to the DES, and randomizing processes based on a permutation table with low differential and linear probabilities are additionally performed between the respective processes. For this reason, the continuity of the data is disturbed to increase the defensive power against attacks such as linear and differential attacks.

In addition, the first and third data encryption/decryption sections 11 and 15 can be set in the DES mode (pattern 2 in FIG. 3) to shorten the encryption time as compared with the case of pattern 1 while maintaining the defensive power against a linear attack and the like.

Furthermore, one of the first and third data encryption/decryption sections 11 and 15 can be set in the DES mode while the other is set in the DES-SS mode to perform an intermediate encryption process between the encryption processes with patterns 1 and 2.

In each pattern described above, various encryption forms can be further set by changing the combination of keys supplied to the respective data encryption/decryption sections 11, 13, and 15. For example, the encryption/decryption unit 10 may take the patterns of supplying different keys to all the data encryption/decryption sections 11, 13, and 15, supplying the same key to the data encryption/decryption sections 11 and 13, supplying the same key to the data encryption/decryption sections 11 and 15, supplying the same key to the data encryption/decryption sections 13 and 15, and supplying the same key to all the data encryption/decryption sections 11, 13, and 15.

These patterns are properly selected in consideration of the performance of the encryption/decryption unit 10, the degree of proliferation of each pattern in the compatible and enhanced cipher modes, an the like.

As described above, the encryption/decryption unit according to this embodiment of the present invention has the first, second, and third data encryption/decryption sections 11, 13, and 15, and the operation modes of the respective processing sections and keys to be supplied thereto can be changed, as needed. Therefore, this unit can be formed as an encryption algorithm unit more efficient than a unit obtained by stacking DES-SS three times, although a single encryption algorithm compatible with DES, triple-DES, and DES-SS is formed. Consequently, such an encryption algorithm unit can be reduced in size as compared with an apparatus separately having three encryption units.

In addition, the encryption/decryption unit 10 of this embodiment can disturb the continuity of data by using the data substitution sections 12 and 14, and hence can make attacks focused on repetition of identical patterns such as linear and differential attacks more difficult, thus improving safety.

Furthermore, according to the unit of this embodiment, since various encryption schemes can be provided with a signal algorithm, an encryption scheme to be used can be selected in accordance with changes in the degree of proliferation of each encryption scheme and the performance of hardware, and can be used for a long period of time.

Second Embodiment

In this embodiment, the arrangements of the functional sections 11 through 16 in the first embodiment are made more practical. Therefore, this embodiment has the same arrangement as that of the first embodiment, and other forms of the functional sections 11 through 16 will be described.

An encryption/decryption unit 10 of this embodiment has the same arrangement as that of the encryption/decryption unit of the first embodiment in FIG. 1. An example of the arrangement of each of functional sections 11 through 16 will be described below. The same reference numerals in FIG. 4 denote the same parts as in FIG. 1, and a detailed description thereof will be omitted.

[Arrangement/Operation of Key Schedule 16]

The key schedule 16 will be described first.

Figure 4:
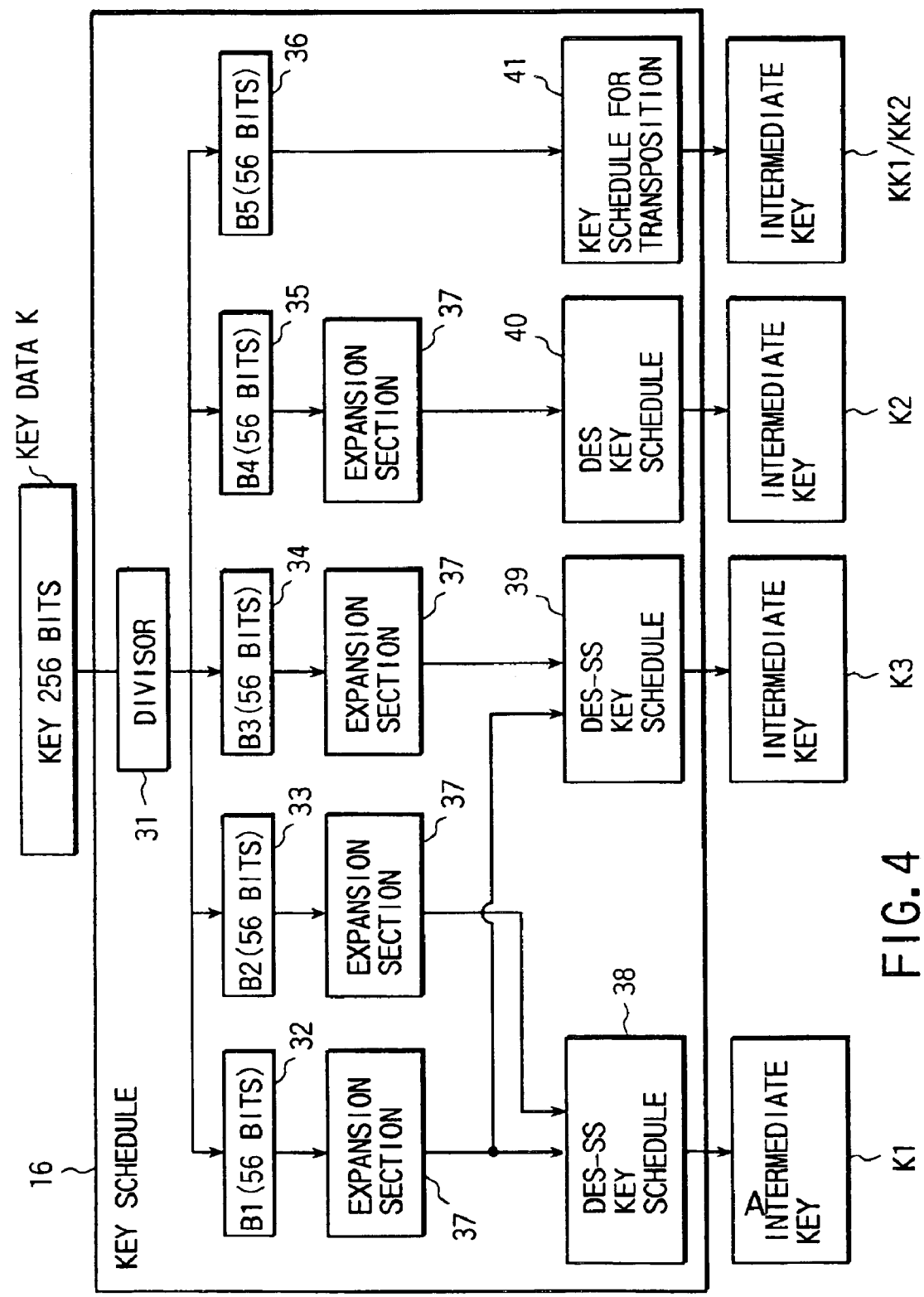
FIG. 4 is a block diagram showing the overall arrangement of a key schedule.

FIG. 4 shows the overall arrangement of the key schedule.

As shown in FIG. 4, the key schedule 16 includes a divisor 31 for dividing 256-bit key data K into five portions and storing them in registers 32, 33, 34, 35, and 36, and expansion sections 37 for reading 56-bit key data from the registers 32 through 35 and expanding/permuting them into 64-bit data. The key schedule 16 also includes DES-SS key schedules 38 and 39, DES key schedule 40, and key schedule 41 for substitution which respectively generate intermediate keys K1, K2, K3, KK1, and KK2 from the expanded permutation result or the contents of the register 36.

In this case, 256-bit key data is divided into four 56-bit blocks B1, B2, B3, and B4 and one 32-bit block B5 by the divisor 31, and these blocks are respectively stored in the registers 32 through 36. This data is divided such that 56-bit blocks are sequentially cut as the blocks B1 through B4 from the 256-bit data, starting from the first bit, and the remaining 32 bits are handled as the block B5.

The four blocks B1 through B4 are respectively input to the expansion sections 37 and expanded to 64-bit blocks by using an expanded permutation table.

Figures 5, 7:
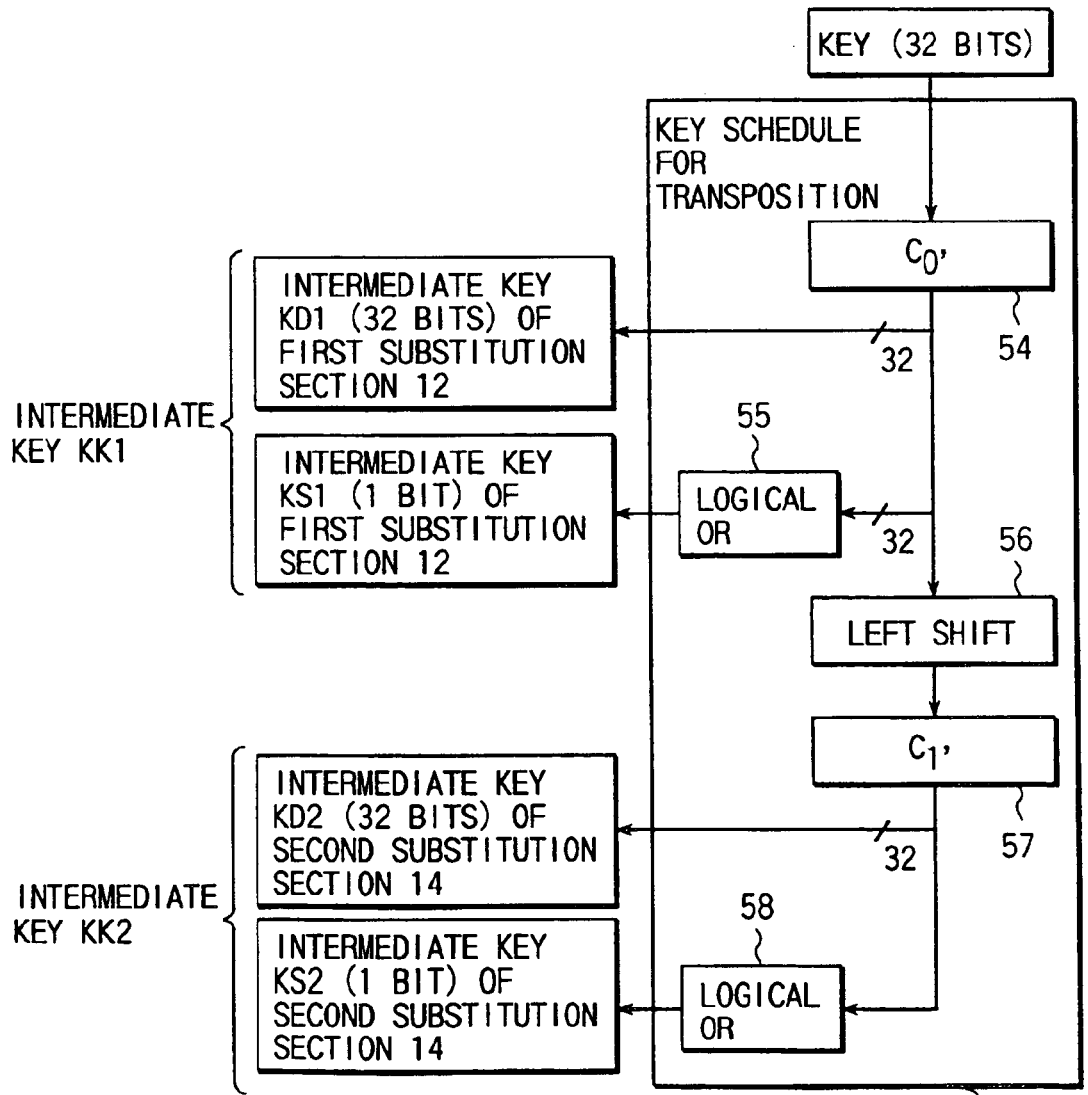
FIG. 5 is a view showing an example of an expanded permutation table.
FIG. 7 is a block diagram showing an arrangement of a key schedule for substitution.

FIG. 5 shows an example of the expanded permutation table.

The table in FIG. 5 corresponds to output bits from the start, and the number at each output bit indicates that the corresponding input is at the nth bit. In the table, "0" indicates that the corresponding output bit is output as 0.

The 128-bit key obtained by linking the 64-bit key formed by expanding the block B1 to the 64-bit key formed by expanding the block B2 is input to the DES-SS key schedule 38 for outputting the intermediate key K1 to the first data encryption/decryption section 11.

The 128-bit key obtained by linking the 64-bit key formed by expanding the block B1 to the 64-bit key formed by expanding the block B3 is input to the DES-SS key schedule 39 for outputting the intermediate key K3 to the third data encryption/decryption section 15.

The 64-bit key formed by expanding the block B4 is input to the DES key schedule 40 for outputting the intermediate key K2 to the second data encryption/decryption section 13. The 32-bit block B5 is input to the key schedule 41 for substitution without being expanded/permutated.

Of the key schedules 38 through 41 described above, the DES key schedule 40 has the same arrangement as that of an extended key generation means in the general DES, and hence a detailed description thereof will be omitted. The DES-SS key schedules 38 and 39 and key schedule 41 for substitution will be described below.

Figure 6:
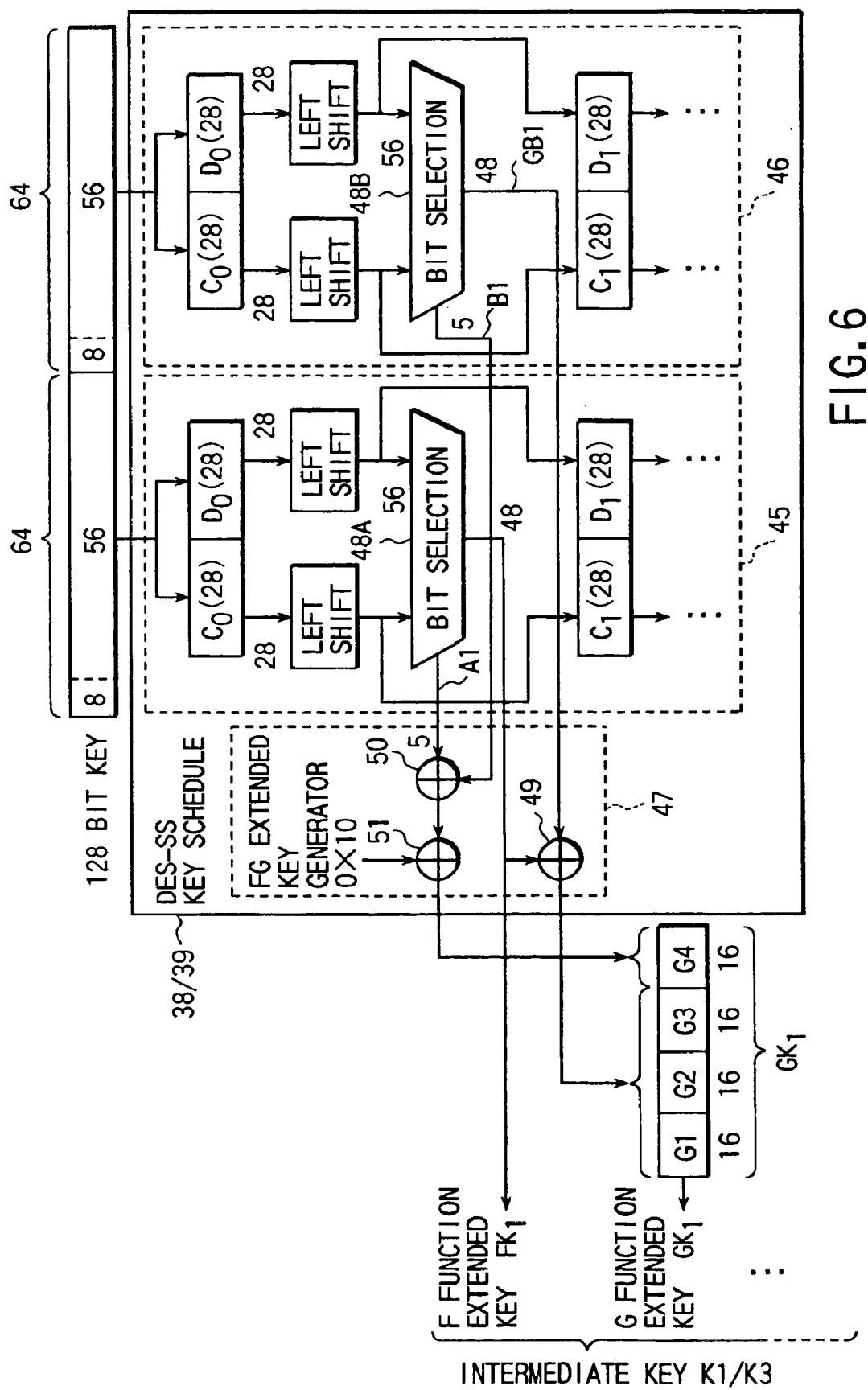
FIG. 6 is a block diagram showing an arrangement of a DES-SS key schedule.

FIG. 6 is a block diagram showing an example of the arrangement of each DES-SS key schedule.

Each of the DES-SS key schedules 38 and 39 is comprised of A schedulers 45, B schedulers 46, and FG extended key generators 47. Note that the FG extended key generators 47 are arranged in correspondence with the respective rounds (1st through 16th rounds), and the A schedulers 45 and B schedulers 46 are also arranged in 16 layers. FIG. 6 shows only one of these components. Note that the numerical values other than the reference symbols represent the numbers of bits.

Of the 128-bit key input from the expansion sections 37, portions corresponding to the blocks B1 and B2 or B3 are respectively input to the A scheduler 45 and B scheduler 46.

Each of the A scheduler 45 and B scheduler 46 has the same arrangement as that of an extended key generation means in the general DES except that a different key is input, and data for generating an extended key is output in a different manner, and hence a description thereof will be omitted.

Intermediate keys in the DES-SS and DES differ in the following point. The DES-SS requires a G function extended key in addition to an F function extended key used in a DES randomizing means.

In the A scheduler 45 and B scheduler 46 in FIG. 6, the bit selection sections 48A and 48B output data for generating the intermediate keys K1 and K2.

In this case, first of all, the bit selection section 48A in the A scheduler 45 outputs an F function extended key FK1 and 5-bit key A1. As this 5-bit key A1, five bits of the 56-bit key input to the bit selection section 48A, e.g., the 9th, 18th, 22nd, 25th, and 35th bits from the left, are used. Such five bits may be selected by another method.

The bit selection section 48B in the B scheduler 46 outputs a 48-bit key GB1 as the source of a G function extended key and a 5-bit key B1 like the key A1. The only difference between each of the A scheduler 45 and B scheduler 46 and a general DES extended key generation means is that the processes performed by the bit selection sections 48A and 48B (ditto for the 2nd through 16th layers) are corrected in this manner.

The FG extended key generator 47 outputs the key output from the bit selection section 48A as the F function extended key FK1. In addition, the generator 47 calculates an exclusive OR 49 of the 48-bit key GB1 and the F function extended key FK1 and outputs the resultant data as part (G1, G2, G3) of a G function extended key GK1. The FG extended key generator 47 calculates an exclusive OR 50 of the keys A1 and B1, and also calculates an exclusive OR 51 of the resultant output and 0X10 (0X represents hexadecimal notation). The generator 47 then outputs the resultant data as part (G4) of the G function extended key GK1.

In this manner, the DES-SS key schedules 38 and 39 obtain the intermediate keys K1 and K3 including the F function extended key FK1 and G function extended key GK1 made up of the keys G1, G2, G3, and G4. In this embodiment, the keys K1 and K3 have the same value. However, these keys need not have the same value.

The intermediate key K1 output from the DES-SS key schedule 38 is input to the first data encryption/decryption section 11. The intermediate key K3 output from the DES-SS key schedule 39 is input to the third data encryption/decryption section 15. Although not described in detail, the intermediate key K2 output from the DES key schedule 40 is input to the second data encryption/decryption section 13, and the second data encryption/decryption section 13 executes encryption/decryption based on the DES.

The key schedule 41 for substitution will be described next.

FIG. 7 is a block diagram showing an arrangement of the key schedule for substitution.

The key schedule 41 receives the block B5 from the register 36 as a 32-bit key and outputs the intermediate keys KK1 and KK2 respectively input to the first data substitution section 12 and the second data substitution section 14.

First of all, a 32-bit key C0' in the register 54 is output as an intermediate key KD1 (32 bits) for the first data substitution section 12 without any change. This key is also input to a logical OR section 55 and left shift section 56. Note that the register 54 may be identical to the register 36.

The logical OR section 55 outputs the logical OR of the respective bits of the 32-bit key C0' as a calculation result, which becomes an intermediate key KS1 (1 bit) for the first data substitution section 12.

The intermediate key KK1 is made up of the intermediate keys KD1 and KS1 and input to the first data substitution section 12.

The data input to the left shift section 56 is shifted by 4 bits to the left and stored as a key C1' in a register 57.

The key C1' becomes a 32-bit intermediate key KD2 input to the second data substitution section 14. A logical OR section 58 calculates the logical OR of the 32 bits of the key C1'. This calculation result becomes a 1-bit intermediate key KS2 input to the second data substitution section 14.

The intermediate key KK2 is made up of the intermediate keys XD2 and KS2 and input to the second data substitution section 14.

The arrangement and operation of the key schedule 16 have been described above. The data substitution sections 12 and 14 will be described next.

[Arrangements and Operations of Data Substitution Sections 12 and 14]

Figure 8:
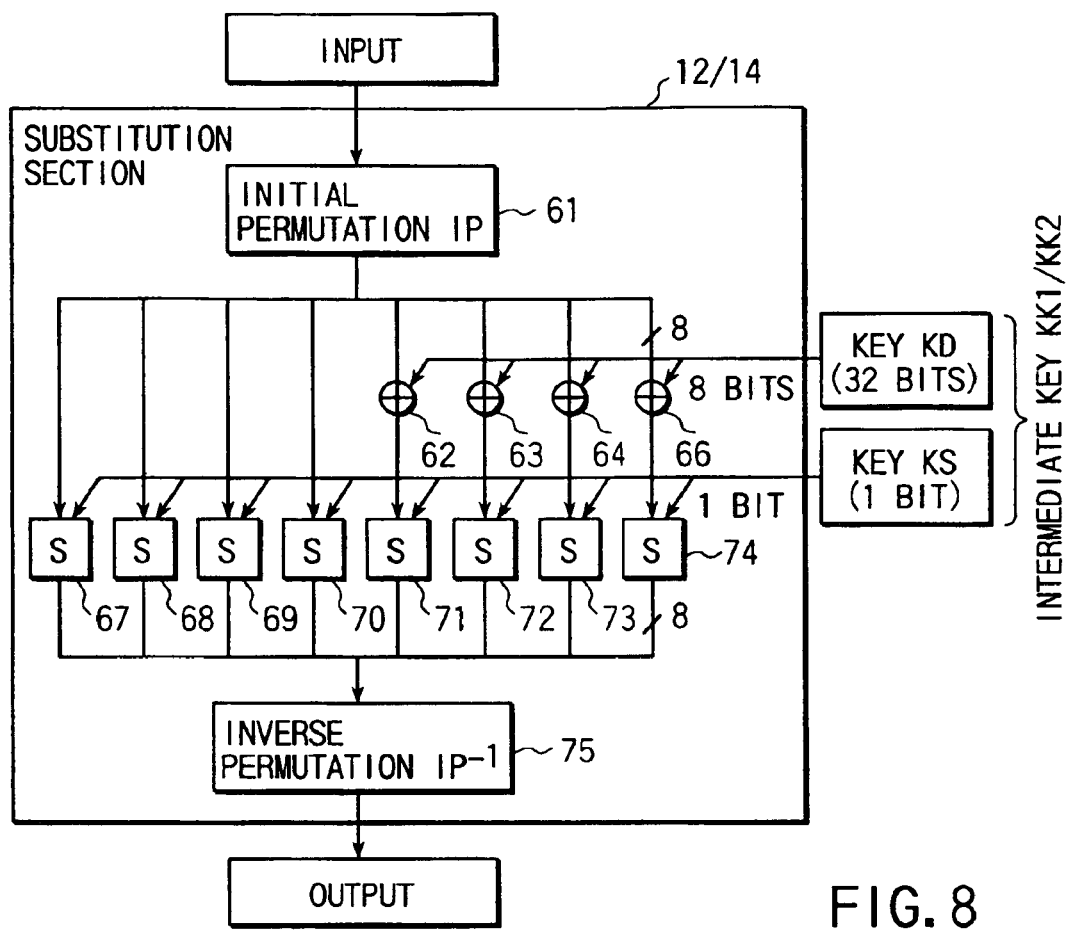
FIG. 8 is a block diagram showing an arrangement of a data substitution section.

FIG. 8 is a block diagram showing an arrangement of each data substitution section.

As shown in FIG. 8, each of the data substitution sections 12 and 14 is comprised of an-initial permutation section 61, exclusive ORS 62 through 66, substitution portions 67 through 74, and inverse permutation section 75. Each of the substitution portions 67 through 74 holds a permutation table like the one shown FIG. 2, converts an input according to the permutation table, and outputs the resultant data.

In this case, first of all, a 64-bit input from the data encryption/decryption section is subjected to bit permutation in the initial permutation (initial permutation IP) section 61. The resultant data is divided into eight blocks each consisting of eight bits.

Of the data output from the initial permutation section 61, the 32 bits of four 8-bit blocks are directly input to the substitution portions 67 through 70, whereas the 32 bits of the four remaining 8-bit blocks are exclusive-ORed with the intermediate key KD (intermediate key KD1/KD2) in the exclusive ORs 62 through 66, and the resultant data are input to the substitution portions 71 through 74.

Eight-bit input data and 1-bit key KS (intermediate key KS/KS2) are input to the substitution portions 67 through 74. In this case, if the key bit is "1", output data corresponding to the input using the permutation table is output. If the key bit is "0", output data identical to the input is output. That is, if the key KS is 0 bit, the data substitution sections 12 and 14 are set in an unused state.

The outputs from the substitution portions 67 through 74 are input to the inverse permutation (inverse permutation $IP^{-1}$) section 75 to be subjected to bit permutation. The resultant data is then output as 64-bit data.

[Arrangements and Operations of First and Third Data Encryption/Decryption Sections 11 and 15]

The first and third data encryption/decryption sections 11 and 15 as DES-SS data randomizing means will be described next.

Figure 9:
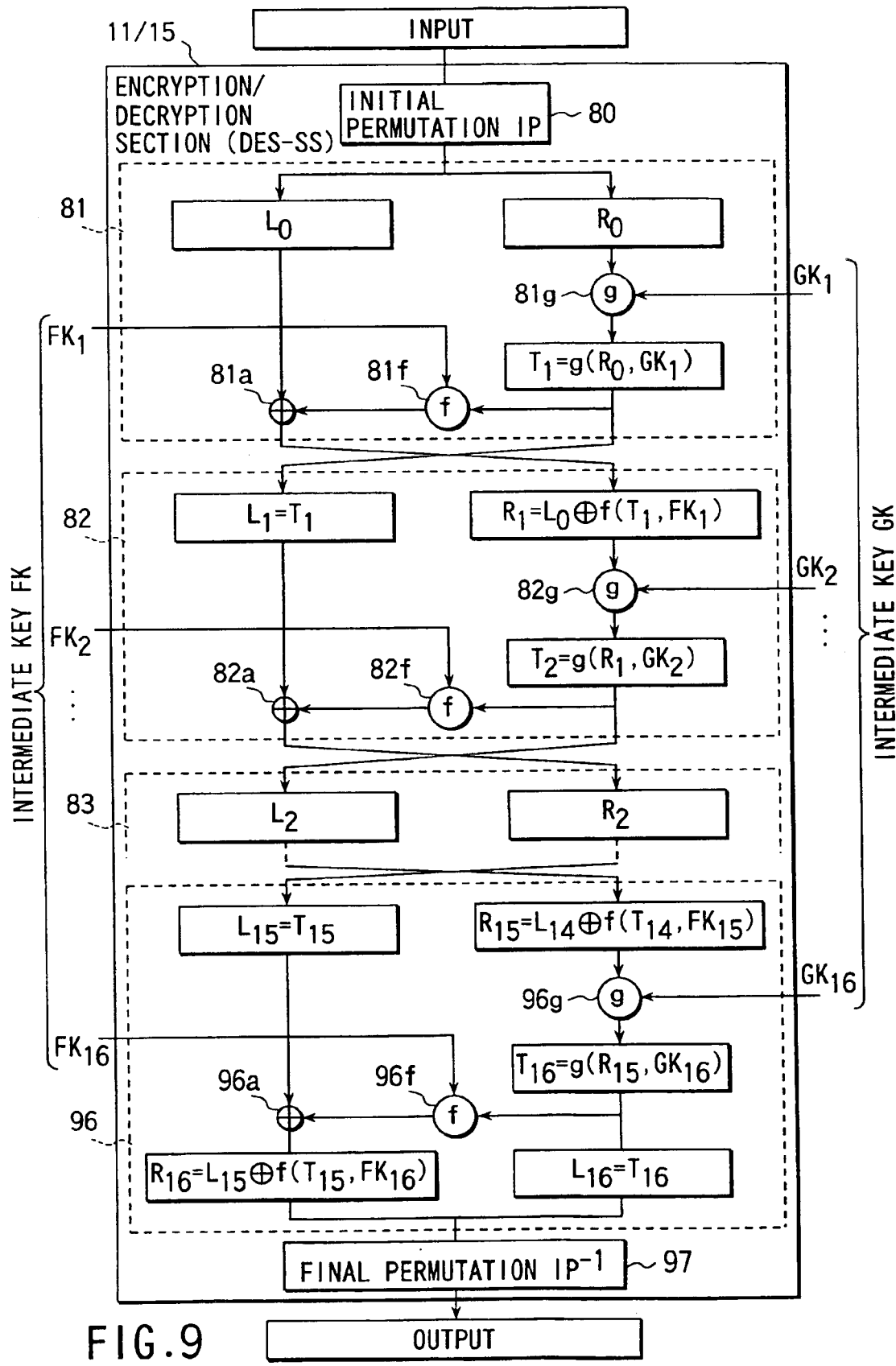
FIG. 9 is a block diagram showing an arrangement of a data encryption/decryption section formed as a DES-SS section.

FIG. 9 is a block diagram showing an arrangement of each data encryption/decryption section as a DES-SS section.

Each of the first and third data encryption/decryption sections 11 and 15 as a DES-SS section randomizes an input (64 bits) depending on the intermediate key K1 or K3 made up of keys GK and FK, and outputs a corresponding ciphertext. Each of the data encryption/decryption sections 11 and 15 is comprised of an initial permutation (initial permutation IP) section 80, 1st through 16th data randomizers 81 through 96, and final permutation section (final permutation $IP^{-1}$) 97. The data randomizers 81 through 96 include F functions 81$f$ through 96$f$ and exclusive ORs 81$a$ through 96$a$ as encryption functions, respectively, and have the same arrangement as that of a DES data randomizing means. These data randomizers also have G functions 81$g$ through 96$g$, respectively, as encryption functions for randomizing data by using the key GK.

In this case, the F functions 81$f$ through 96$f$ are used to perform randomizing processing similar to that in the general DES. The F functions 81$f$ through 96$f$ receive the F function extended key FK of the intermediate keys K1 and K3 and outputs from the G functions 81$g$ through 96$g$, perform predetermined randomizing processing, and output the resultant data to the exclusive ORs 81a through 96a.

The exclusive ORs 81a through 96a output the exclusive ORs of 32-bit Ln (L0 through L15) and outputs from the F functions 81f through 96f as right 32-bit Rn+1 to the input on the next stage.

The G functions 81g through 96g perform randomizing processing to be described later. These G functions receive G function extended keys GK and Rn (R0 through R15) of the intermediate keys K1 and K3, perform predetermined randomizing processing, and output the resultant data to left 32 bits Ln+1 of the input on the next stage and the F functions 81f through 96f.

The data randomizers 81 through 96 on the respective layers execute the same processing. The operation on the first layer will be described first.

In each of the data encryption/decryption sections 11 and 15, an input (64 bits) is permutated by the initial permutation section 80, and the resultant data is divided into two equal halves to generate left 32-bit data L0 and right 32-bit data R0.

In the first data randomizer 81, the data R0 is input to the encryption G function 81g, and the G function output is input to the encryption F function 81f and output as left 32-bit data L1 to the second data randomizer 82. The data L0 is input to the exclusive OR section 81a and is exclusive-ORed with the F function 81f, and the resultant data is output as right 32-bit data R1 to the second data randomizer 82.

After the above randomizing processing is performed on the first layer, similar processing is performed up to the 16th layer. An output from the 16th layer is permutated by the final permutation section 97 to become a 64-bit output.

Processing in the G functions 81g through 96g will be described next.

Figure 10:
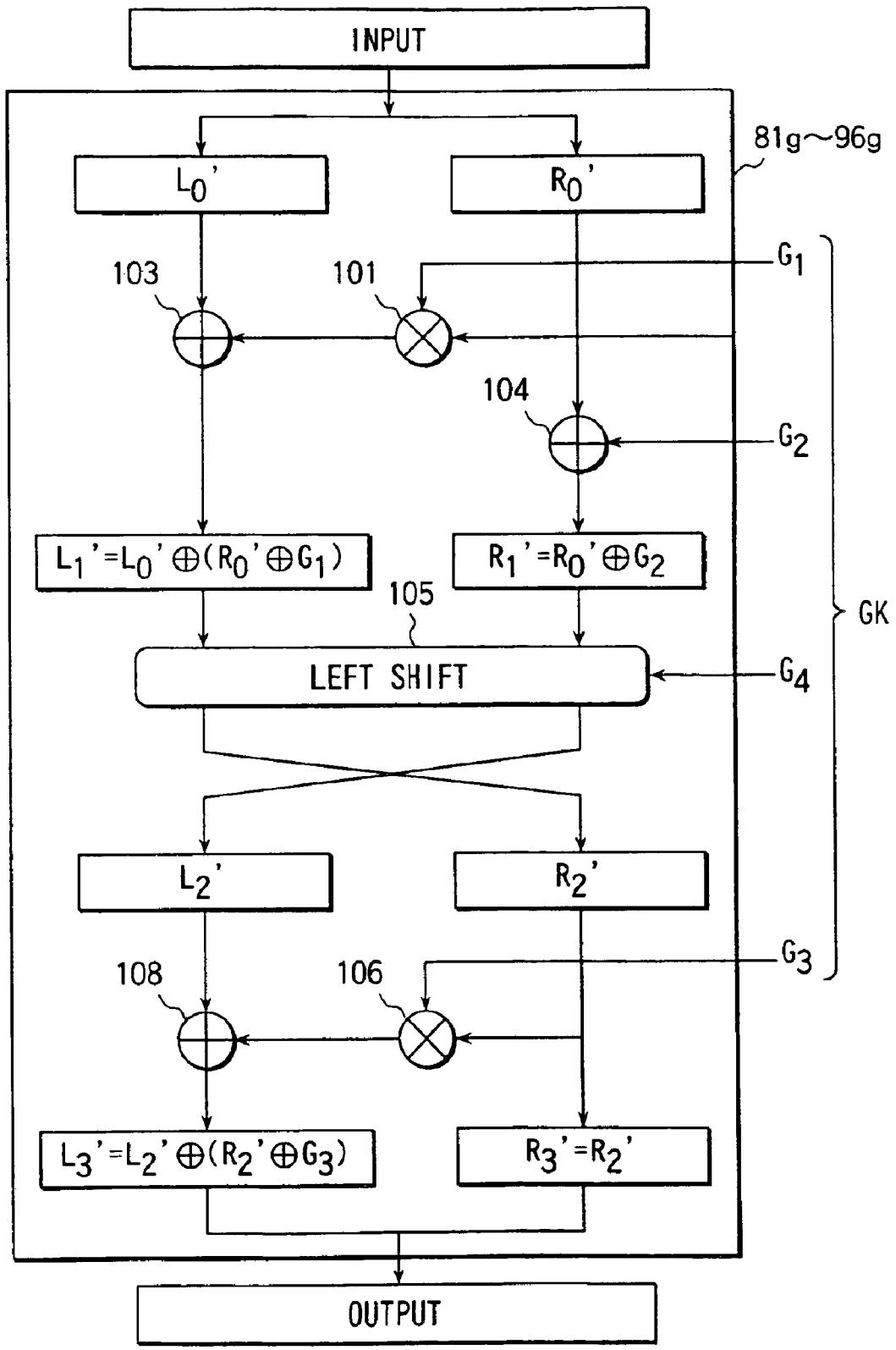
FIG. 10 is a block diagram showing an arrangement of a G function.

FIG. 10 is a block diagram showing an arrangement of a G function.

Each of the G functions 81g through 96g is designed to randomize input data by using the four keys G1, G2, G3, and G4 contained in the G function extended key GK and output the resultant data. For this purpose, each of the G functions 81g through 96g includes exclusive OR sections 103, 104, and 108, logical product sections 101 and 106, and left shift section 105.

Note that reference symbols L0', L1', L2', L3', R0', R1', L2', and R3' in FIG. 10 indicate that these data are stored in the registers or transferred to the next functional means.

In this G function, first of all, an input (32 bits) is divided into two equal halves to generate left 16-bit data L0' and right 16-bit data R0'.

The data R0' is input to the logical product section 101 and the exclusive OR section 104. The data L0' is input to the exclusive OR 103.

The logical product section 101 calculates the logical product of the data R0' and the extended key G1 and outputs the resultant data to the exclusive OR 103. The exclusive OR 103 calculates the exclusive OR of the data L0' and the output from the logical product section 101. As a result, data L1' is input to the left shift section 105.

The exclusive OR section 104 calculates the exclusive OR of the data R0' and the extended key G2. A result R1' is then input to the left shift section 105.

The left shift section 105 shifts the data to the left according to the number of bits of the extended key G4. The shift result is divided into two equal halves to generate left 32-bit data R2' and right 32-bit data L2'.

The data R2, is input to the logical product section 106. The data L2' is input to the exclusive OR section 108. The logical product section 106 calculates the logical product of the data R2' and the extended key G3 and outputs the resultant data to the exclusive OR section 108.

The exclusive OR section 108 calculates the exclusive OR of the data L2' and the output from the logical product section 106 to obtain the left 32 bits of the G function output. The data R2' is used as the right 32 bits of the G function output.

In this G function, while an input is divided and the divided inputs are connected again and shifted, randomizing processing is performed, thereby increasing the randomizing degree of output data.

[Arrangement and Operation of Second Data Encryption/Decryption Section 13]

The second data encryption/decryption section 13 has the same arrangement as that of a general DES data randomizing means, and hence a detailed description thereof will be omitted. The DES data randomizing means is described in Eiji Okamoto, "Introduction to Cryptographic Theory", Kyoritu Shuppan, 1993 or the like. For example, an arrangement obtained by omitting the G functions 81g through 96g from the DES-SS arrangement shown in FIG. 9 and eliminating the necessity of the G function extended key GK is an example of a DES data randomizing means.

[Operation of Encryption/Decryption Unit 10 Corresponding to Key Data K]

Assume that the respective functional sections 11 through 16 of the encryption/decryption unit 10 of this embodiment have the same arrangements as described above and operate in the same manner as described above. The following description is about how the contents of the encryption/decryption unit 10 as an encryption or decryption unit change in accordance with the contents of the key data K supplied to the key schedule 16.

In this case, as shown in FIG. 4, the key data K is divided into the blocks B1 through B5, and the processing to be performed by this unit 10 is determined in accordance with the contents of the respective blocks B1 through B5.

When at least some bits of the block B5 are ON, and the logical ORS 55 and 58 are not 0, the key KS does not become 0. As a consequence, data substitution processing is executed by the substitution portions 67 through 74 in each of the data substitution sections 12 and 14. In this case, the encryption/decryption unit 10 operates in the enhanced cipher mode in FIG. 3. As a result, unlike the conventional DES, DES-SS, or triple-DES, the continuity of a cipher is disturbed by a permutation table to realize enhanced encryption.

If independent data are supplied as the key data of the blocks B1 through B5, the resultant encryption algorithm is used a safer encryption algorithm with a 256-bit key.

When all the input bits of the 32-bit key block B5 input to the key schedule 41 for substitution are "0", since the key KS output from the logical ORS 55 and 58 becomes "0", the permutation table in the data substitution sections 12 and 14 are not used. In this case, therefore, the data substitution sections 12 and 14 output the same data as the input and perform identity conversion depending on the intermediate keys KK1 and KK2.

When identity conversion is performed by the data substitution sections 12 and 14, the encryption/decryption unit 10 operated in the compatible mode in FIG. 3. This case will be described in more detail below.

Referring to FIG. 4, first of all, data having the same contents as the block B1 are input as the blocks B2 and B3, the DES-SS key schedules 38 and 39 generate intermediate keys for performing encryption processing in which the first and third data encryption/decryption sections 11 and 15 are set in the DES encryption mode. To set the first and third data encryption/decryption sections 11 and 15 in the DES mode, the G function input/output operation in FIG. 9 should be identity conversion. This identify conversion is implemented when the extended keys G1 through G4 become predetermined inputs in the G function processing in FIG. 10.

In this case, in the overall encryption unit, the first data encryption/decryption section 11 performs DES encryption by using the key bits input as the block B1, and the second data encryption/decryption section 13 performs DES decryption by using the key bits input as the block B4. The contents of this processing are therefore the same as those in the triple-DES using two 56-bit keys.

In this case, when the blocks B1 and B4 have the same contents, and one of the blocks B2 and B3 is set to have the same contents as those of the block B1, the unit of this embodiment operates in the compatible mode with respect to the DES-SS for the following reason. Since the data encryption/decryption section 11 or 15 which receives the same contents as those of the block B1 operates in the DES mode, and the processing in the second data encryption/decryption section 13 is canceled, only the portion of the DES-SS mode remains.

In this case, if, for example, the block B3 has the same contents as those of the block B1, the contents of the processing performed by the overall encryption/decryption unit 10 become the same as those performed by a DES-SS unit which receives the 128-bit key obtained by linking the outputs respectively obtained by performing expanded permutation of the blocks B1 and B2.

As described above, the encryption/decryption unit according to this embodiment of the present invention divides 256-bit key data K into five blocks, and generates data with which whether to use the first and second data substitution sections 12 and 14 and the operation modes of the first, second, and third data encryption/decryption sections 11, 13, and 15 can be designated, as well as substantial intermediate key, data, by using the respective block data, thereby controlling the operation mode of the overall unit. This makes it possible to implement a unit similar to that of the first embodiment and obtain the same effects as those of the first embodiment.

In this embodiment, therefore, the operation mode can be easily changed by only correcting the contents of the key data K, and a single encryption algorithm which is compatible with all the DES, triple-DES, and DES-SS can be formed. In addition, encryption which can disturb the continuity of data and is resistant to linear and differential attacks can be implemented.

Third Embodiment

In this embodiment, the first and third data encryption/decryption sections 11 and 15 and G functions in the second embodiment are improved.

Figure 11:
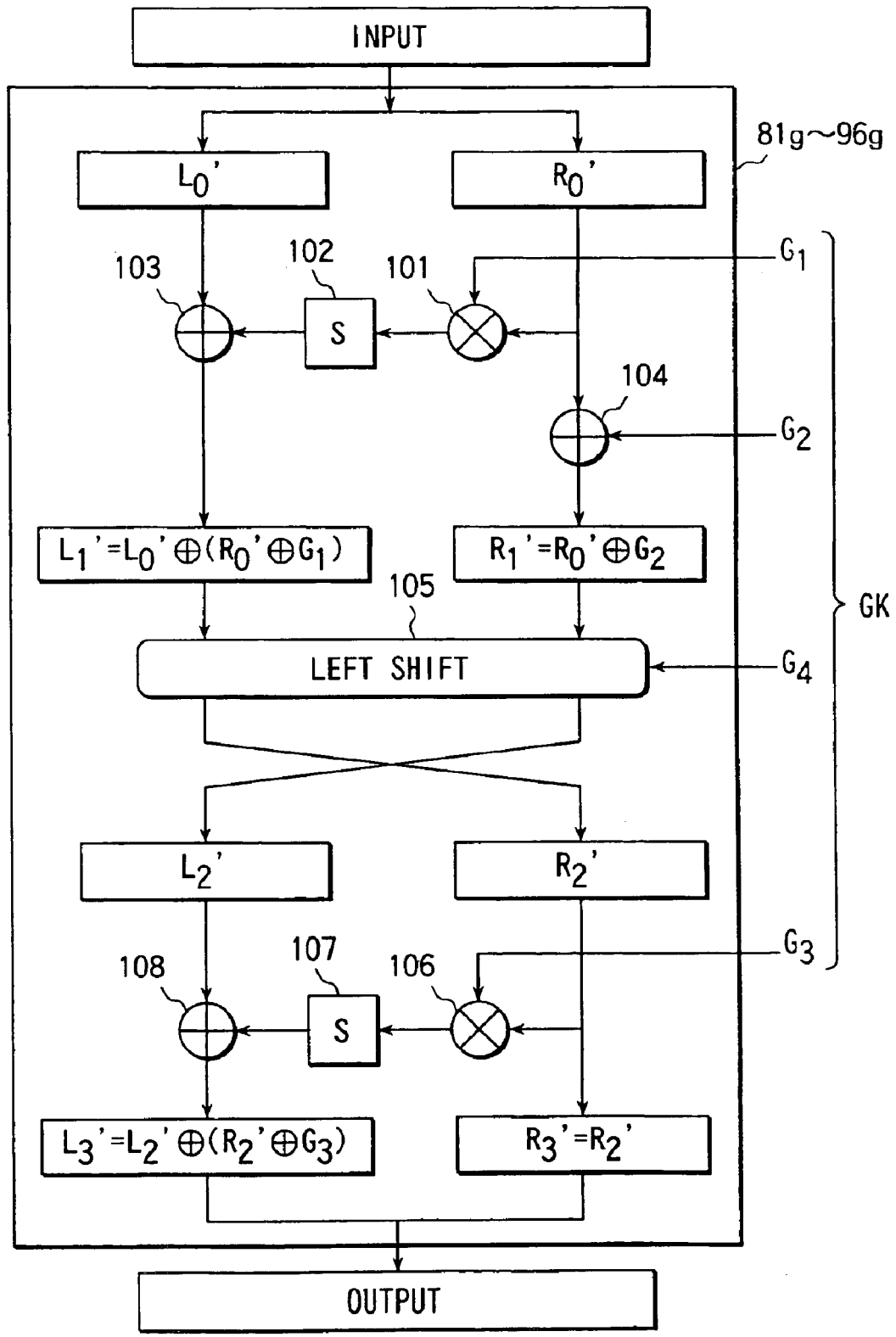
FIG. 11 is a block diagram showing an arrangement of a G function in an encryption/decryption unit according to the third embodiment of the present invention.

FIG. 11 is a block diagram showing an arrangement of a G function in an encryption/decryption unit according to the third embodiment of the present invention. The same reference numerals in FIG. 11 denote the same parts as in FIGS. 1 through 10, and a description thereof will be omitted.

As shown in FIG. 11, an encryption/decryption unit 10 has the same arrangement as that of the second embodiment except that in each of G functions 81g through 96g in each of first and third data encryption/decryption sections 11 and 15, a substitution portion 102 is inserted between a logical product 101 and an exclusive OR 103, and a substitution portion 107 is inserted between a logical product 106 and an exclusive OR 108. In the strict sense, therefore, the G functions 81g through 96g described in this embodiment are different from the G functions in the DES-SS, and are obtained by correcting the G functions in the DES-SS.

Each of the substitution portions 102 and 107 has a permutation table like the one shown in FIG. 2, which has high difference uniformity and nonlinearity, converts an input according to the permutation table, and outputs the resultant data.

The encryption/decryption unit 10 having the above arrangement operates in the same manner as in the second embodiment, and the newly added substitution portions 102 and 107 operate in the following manner.

First of all, the substitution portion 102 receives an output from the logical product 101. This logical product is transposed according to the permutation table, and the resultant data is output to the exclusive OR 103.

The substitution portion 107 receives an output from the logical product 106. This logical product output is transposed according to the permutation table as in the case of the substitution portion 102. The resultant data is output to the exclusive OR 108.

Since the substitution portions 102 and 107 using the permutation table with low difference probability and low linear probability are inserted in each of the G functions 81g through 96g in this embodiment, the continuity of data is disturbed, and encryption resistant to linear and differential attacks is implemented.

In this embodiment, as the permutation table used in the substitution portions 102 and 107, the table shown in FIG. 2 is used. As a modification of this embodiment, however, a permutation table obtained by a fine transformation of the permutation table in FIG. 2 may be used, in which "0" is output with respect to an input "0". In this case, with a specific key input, the substitution portions 102 and 107 output "0", and no key data is inserted in the exclusive OR sections 103 and 108. When, therefore, such a permutation table is used, a G function can serve as an identity conversion function in which an input and an output coincide with each other.

With the use of the substitution portions 102 and 107, even if the occurrence rates of bits 0 and bits 1 of the logical products of keys in the logical product sections 101 and 106 become nonuniform, this nonuniformity is corrected by the processes performed by the substitution portions 102 and 107, ensuring safety against an attack focused on the number of bits 1 contained in a key.

If, for example, the number of bits 1 in the extended key G1 is one, a key inserted in the exclusive OR section 103, i.e., the substantial bit count in an exclusive OR is as small as one. As a result of data substitution by the substitution portion 102, however, the number of bits of an inserted key changes, and safety is ensured against an attack focused on the number of bits 1 contained in a key.

As described above, the encryption/decryption unit according to this embodiment of the present invention, since the substitution portions 102 and 107 are inserted in each G function, the continuity of data is disturbed, and encryption resistant to linear and differential attacks can be implemented.

Note that the unit of each embodiment described above can be implemented by loading programs from a storage medium into a computer.

Figure 12:
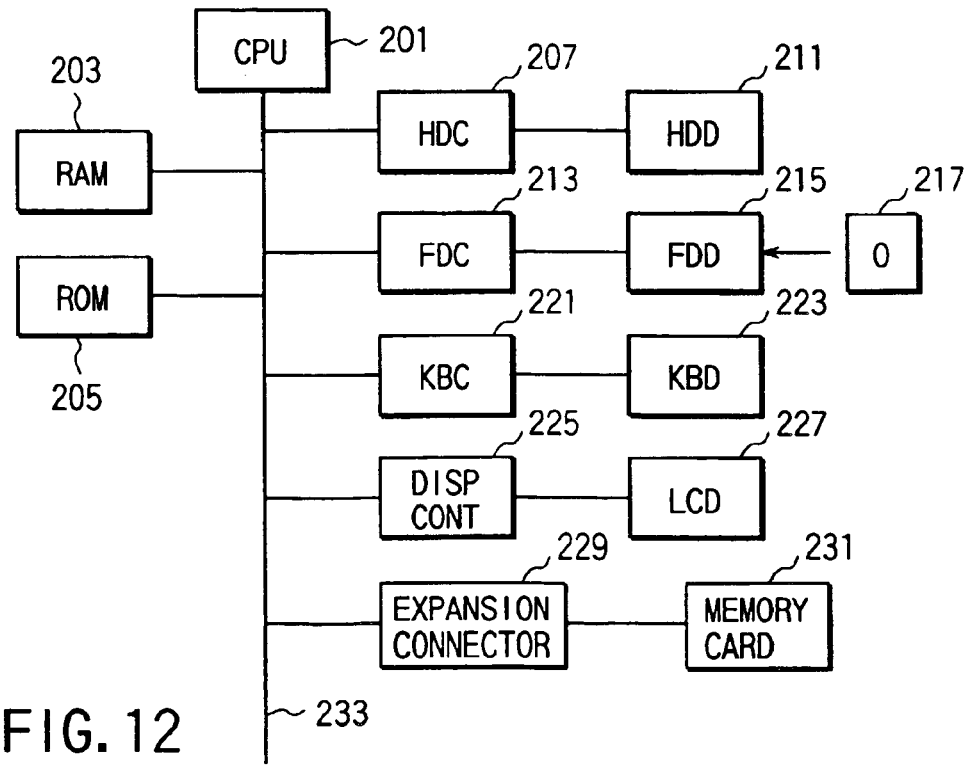
FIG. 12 is a block diagram showing an embodiment of a computer for implementing the encryption/decryption unit and storage unit according to the present invention.

FIG. 12 is a block diagram showing an embodiment in which an encryption/decryption unit and storage medium of the present invention are implemented. As shown in FIG. 12, a CPU 201, a RAM 203 in which a work area and programs are loaded, and a ROM 205 storing programs and the like are connected to a system bus 233. In addition, a hard disk drive 211 and floppy disk drive 215 are connected to the system bus 233 through a hard disk controller 207 and floppy disk controller 213, respectively. A floppy disk 217 is loaded into the floppy disk drive 215. A keyboard unit 223 and liquid crystal display unit 227 are also connected to the system bus 233 through a keyboard controller 221 and display controller 225, respectively. Furthermore, a memory card 231 is connected to the system bus 233 through an expansion connector 229. Programs for implementing the algorithms shown in FIGS. 1, 4 and 6 through 11 and the tables shown in FIGS. 2 and 5 are stored in a storage medium such as the RAM 203, ROM 205, HDD 211, FDD 215, or memory card 231.

The storage medium in the present invention may take any storage forms as long as it is a computer-readable storage medium capable of storing programs. For example, such a storage medium includes a magnetic disk, floppy disk, hard disk, optical disk (CD-ROM, CD-R, DVD, or the like), magneto-optical disk (MO or the like), and semiconductor memory.

In addition, an OS (Operating System) operating on a computer on the basis of commands from programs installed from a storage medium into the computer, MW (middleware) such as database management software or network software, or the like may execute part of the processes for implementing this embodiment.

The storage medium in the present invention includes not only a medium independent of the computer but also a storage medium in which a program sent through a LAN, Internet, or the like is downloaded and stored or temporarily stored.

In addition, the number of storage media is not limited to one, and the storage medium of the present invention also includes a combination of media used to execute the processes in this embodiment. That is, the present invention is not limited to any specific storage arrangement.

Note that the computer in the present invention executes the respective processes in this embodiment on the basis of the programs stored in the storage medium, and the present invention may take any arrangement, e.g., an apparatus consisting of a single device such as a personal computer or a system constituted by a plurality of devices connected to each other through a network.

Furthermore, the computer of the present invention is not limited to a personal computer, and is a generic name for devices and apparatuses capable of implementing the functions of the present invention on the basis of programs, including processing units, microcomputers, and the like contained in data processing devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An encryption/decryption unit for encrypting a plaintext into a ciphertext and/or decrypting a ciphertext into a plaintext, comprising:
   first encryption/decryption means for performing an encryption or decryption process;
   first substitution means for performing data substitution of an output from said first encryption/decryption means according to a predetermined permutation table;
   second encryption/decryption means for performing an encryption or decryption process for an output from said first substitution means;
   second substitution means for performing data substitution of an output from said second encryption/decryption means according to a predetermined permutation table;
   third encryption/decryption means for performing an encryption or decryption process for an output from said second substitution means;
   key generating means for generating intermediate keys respectively supplied to said first, second, and third encryption/decryption means and said first and second substitution means; and
   said first and second substitution means functioning to perform identity conversion when the intermediate key generated by said key generating means contains predetermined data;
   wherein said key generating means comprises:
   dividing means for dividing key data K of a predetermined number of bits into a plurality of data and storing the divided data into respective register;
   expanded permutation means for reading out the divided key data from the respective registers and effecting an expanded permutation on the divided key data;
   DES-SS key schedule means for generating intermediate keys K1 and K3 from a result of the expanded permutation performed by said expanded permutation means;
   DES key schedule means for generating an intermediate key K2 from a result of the expanded permutation performed by said expanded permutation means; and
   substitution schedule means for generating intermediate keys KK1 and KK2 from the contents of the registers.

2. A unit according to claim 1, wherein said expanded permutation means comprises an expanded permutation table for expanding input 56-bit key data into 64-bit data.

3. A unit according to claim 1, wherein said substitution schedule means receives one of the divided key data as a 32-bit key, and outputs an intermediate key KK1 input to said first substitution means and an intermediate key KK2 input to said second substitution means, said substitution schedule means comprising:
   first means for directly outputting the input 32-bit key as an intermediate key KD1 of said first substitution means, calculating a logical OR of the intermediate key, and outputting the logical OR as an intermediate key KS1 (one bit) of said first substitution means; and
   second means for shifting the input 32-bit key to the left to output the key as an intermediate key KD2 of said second substitution means, and calculating a logical OR of the intermediate key KD2 to output the key as an intermediate key KS2 (one bit) of said second substitution means.

4. A unit according to claim 3, wherein each of said first and second substitution means comprises an initial permutation section, an exclusive OR, a substitution portion, and an inverse permutation section, and said initial permutation section performs bit permutation of a 64-bit input and divides the permutation result into 8 blocks each comprising 8 bits,
   32-bit data comprised of the first four 8-bit blocks of the output of said initial permutation section are directly input to said substitution portion, and 32-bit data comprised of the remaining four blocks is exclusive-ORed with the intermediate key KD, and a result of the exclusive-OR operation is output to said substitution portion,
   said substitution portion outputs output data corresponding to an input using a permutation table when the 1-bit key KS is at "1", and outputs data identical to the input when the 1-bit key KS is at "0", and
   said inverse permutation section receives the output data from said substitution portion, performs bit permutation of the received data, and outputs the data as 64-bit data.

* * * * *

UNITED STATES PATENT AND TRADEMARK OFFICE
CERTIFICATE OF CORRECTION

PATENT NO. : 6,985,582 B1
DATED : January 10, 2006
INVENTOR(S) : Sano et al.

It is certified that error appears in the above-identified patent and that said Letters Patent is hereby corrected as shown below:

Column 16,
Line 9, change "register" to -- registers --.

Signed and Sealed this

Twenty-eighth Day of March, 2006

JON W. DUDAS
*Director of the United States Patent and Trademark Office*